United States Patent [19]

Gillund

[11] Patent Number: 4,930,801
[45] Date of Patent: Jun. 5, 1990

[54] FRONT MOUNTED IMPLEMENT

[75] Inventor: Ronald D. Gillund, Cary, Ill.

[73] Assignee: Mathews Company, Crystal Lake, Ill.

[21] Appl. No.: 98,483

[22] Filed: Sep. 18, 1987

[51] Int. Cl.$^5$ .................. B60B 39/00; A01B 59/043
[52] U.S. Cl. .......................... 280/481; 56/DIG. 10; 172/449; 172/810; 280/461.1
[58] Field of Search ............... 280/481, 456.1, 460.1, 280/461.1; 180/89.1, 311, 312, 53.3, 53.7; 172/439, 443, 449, 810; 56/15.8, DIG. 10

[56] References Cited

U.S. PATENT DOCUMENTS

| | | | |
|---|---|---|---|
| 2,465,405 | 3/1949 | Strawn | 56/DIG. 10 |
| 3,770,064 | 11/1973 | Scarnato et al. | 56/504 X |
| 3,802,172 | 4/1974 | Mathews | 56/15.8 |
| 4,116,283 | 9/1978 | Blessent | 172/443 |
| 4,148,174 | 4/1979 | Mathews et al. | 56/504 X |
| 4,448,274 | 5/1984 | van der Lely | 180/15 |
| 4,519,623 | 5/1985 | Orthman | 172/439 X |

FOREIGN PATENT DOCUMENTS 67965 10/1975 Australia .................. 280/461 A Primary Examiner—Mitchell J. Hill
Attorney, Agent, or Firm—Thomas W. Speckman; Douglas H. Pauley

[57] ABSTRACT

An implement adapted for connection to a vehicle three point hitch on the front of a pushing vehicle wherein the implement is provided with at least one forward ground contacting rolling support means mounted to a forward portion of the implement frame, at least one rear ground contacting rolling support means mounted to a rear portion of the implement frame, and a rear upper implement hitch connection which provides a vertically pivotal and longitudinally floating link means. The implement and hitch connection of this invention provides an implement capable of being pushed by a vehicle over uneven terrain while providing implement treatment at a predetermined even distance above the uneven terrain.

18 Claims, 1 Drawing Sheet

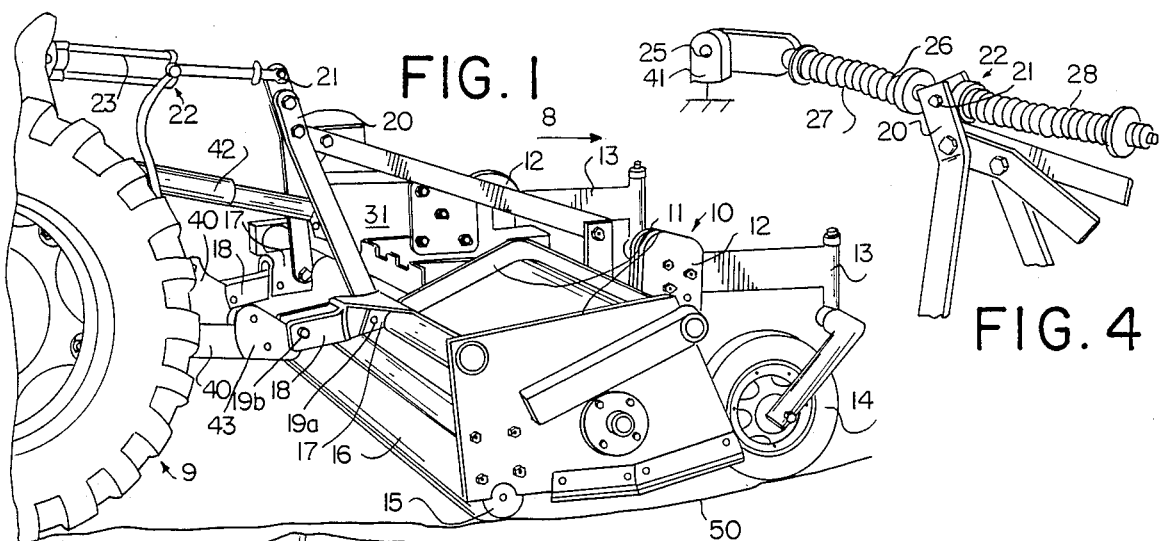
FIG. 1
FIG. 4
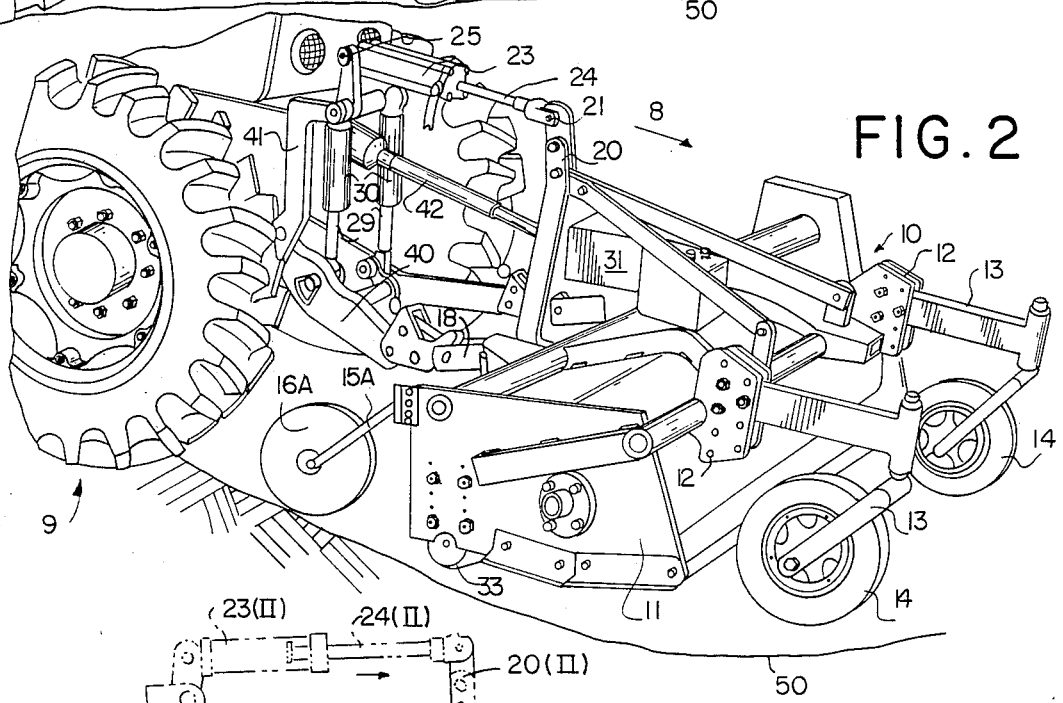
FIG. 2
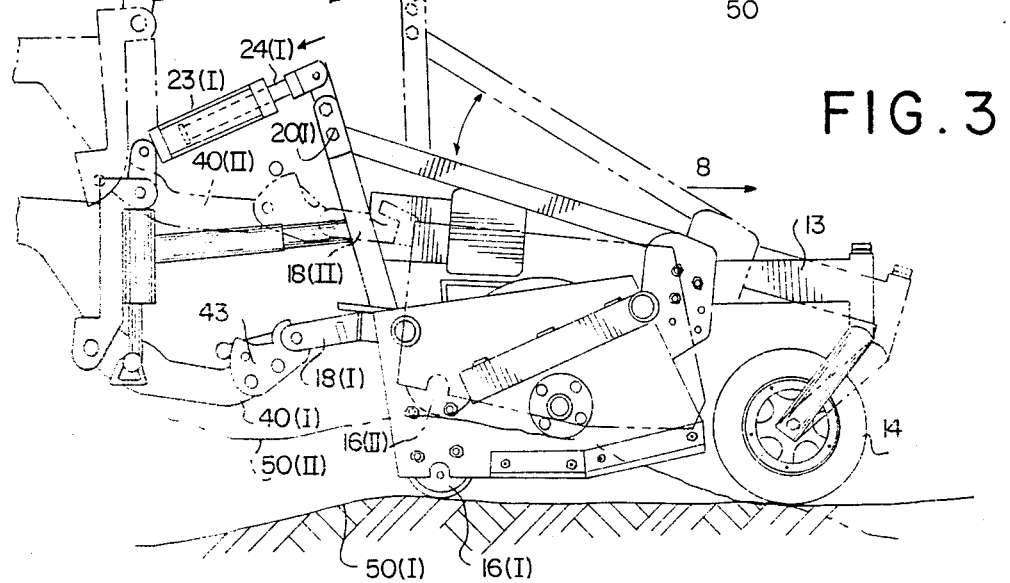
FIG. 3

4,930,801

FRONT MOUNTED IMPLEMENT

BACKGROUND OF THE INVENTION

1. Field of the Invention

An implement mounting for connection to a three point hitch on the front of a tractor. The implement mounting provides for pushing the implement, rather than conventional towing of the implement, in a manner which allows the implement to closely follow uneven ground. The implement support and its push mounting is especially suitable for mowers, providing very even length grass cutting which may follow rough and uneven ground surfaces.

2. Description of the Prior Art

Power vehicles, such as tractors, are well known for pulling implements using a three point hitch. The use of three point hitches on the rear of tractors has been common practice for many years. Generally, implements pulled by a tractor using a three point hitch are supported by ground contacting wheels or rollers at their rear end and are supported at their forward end by the three point hitch. An improved three point hitch connection for a tractor drawn implement is shown in U.S. Pat. No. 3,802,172. As shown by U.S. Pat. No. 3,802,172, the lower hitch members support the front of the mower and the upper hitch link controls the forward tilt or aspect of the mower.

SUMMARY OF THE INVENTION

Recently, three point hitches have been made available on the front end of vehicles such as tractors. I have found that pushing an implement using the connection of a conventional three point hitch, as used in the past for pulling the implement, has not been satisfactory. The reaction of a pushed implement using a conventional three point hitch to uneven ground is exaggerated, leading to driving the implement into the ground. This is especially true when traversing uneven ground during operations such as mowing, resulting in both scalping of the ground in some places and having unevenly long grass in other places. Adjustment of the lower and upper linkages of the three point hitch, such as by pneumatic cylinders, cannot be manually effected to accommodate uneven terrain such as encountered in mowing grass crosswise in ditches.

I have found that according to the present invention, an implement may be supported at both its forward and rear ends by ground contacting rolling support means, while providing vertically pivotal and longitudinally floating link means at the upper three point hitch connection between the implement and the pushing vehicle. This pushing connection between the implement and the vehicle allows the implement to closely follow the ground contour providing even mowing of grass with reduced stress upon the implement, the hitch, and the pushing vehicle.

This invention is applicable to a number of implements, such as planters, sprayers, cultivators, mowers and the like, and to any pushing motive vehicle, such as tractors. The invention is particularly suitable for mowers in that the terrain encountered in mowing is frequently more irregular than field terrain traversed by farming implements. Also, there is less tolerance for forward and downward tilting of the implement resulting in scalping and unusually high cut, particularly, where an even height of cut is most desired.

BRIEF DESCRIPTION OF THE DRAWING

The above and other objects, features and advantages of this invention will become apparent by reading of the following detailed description in conjunction with the drawings wherein:

FIG. 1 is a rear perspective view of an implement embodying this invention connected to a three point hitch on the forward end of a tractor;

FIG. 2 is a forward perspective view showing the three point hitch as shown in FIG. 1 and showing a different embodiment of an implement according to this invention;

FIG. 3 is a side view of the implement shown in FIG. 1, showing positioning of the hitch when the implement is on different terrains; and FIG. 4 is a perspective view showing another embodiment of the longitudinally floating link means used in the connection of this invention.

DESCRIPTION OF PREFERRED EMBODIMENTS

FIGS. 1–3 show tractor 9 having a three point hitch on its forward end connected to mower 10 and moving in the direction indicated by arrow 8.

The three point hitch has vehicle horizontally spaced lower hitch brackets 40 and vehicle upper hitch bracket 41 extending forwardly from the tractor. Vehicle lower hitch brackets 40 are frequently provided with vehicle lower hitch link 43 which has limited pivotol action allowing in the order of two inches vertical movement at its forward end. Vehicle lower hitch brackets 40 are provided with implement hoisting hydraulic cylinders 30 with pistons 29 to lift the implement free of the ground for turn-around at the end of implement treating paths. In the practice of this invention, it is preferred to allow pistons 29 to float in cylinders 30 during implement operations to provide a greater extent of vertical movement of the rear of the implement. Power take-off 42 extends between tractor 9 and implement 10 to provide operation of the implement itself through implement power take-off drive 31. The power operation of the implement follows conventional practices.

The implement, shown in the figures for specific illustration as a mower, has a suitable frame structure 11 as well known to the art for mounting the active components of the implement, such as the rotor of a mower by means well known in the art and provision for its drive through implement power take-off drive 31. At least one forward ground contacting rolling support means, shown as casters 14 in the figures, is mounted to the forward end of frame 11, forward caster arm 13 being mounted to forward caster bracket 12 on frame 11. Forward caster bracket 12 and forward caster arms 13 are mounted to frame 11 so that the ground contact surface of caster 14 is maintained in fixed relationship to frame 11. Adjustability of the fixed relationship of caster 14 to frame 11 may be achieved by a plurality of holes in forward caster bracket 12 for desired vertical adjustment. The mounting of forward casters 14 is preferably pivotal about a generally vertical axis to reduce side load stresses on the caster mounting bracket and arm. While it is preferred to provide horizontally spaced forward casters toward the outer edge of the width of frame 11, the implement of this invention may also be satisfactorily used with a centrally located forward caster as shown in FIG. 3. While it is preferred to provide a caster-type forward ground contacting rolling support means, as shown in the figures, it is also within this invention to provide a roller-type forward ground contacting rolling support means, the disadvantage being that for operations such as mowing, a full width roller would undesirably mat the grass against the ground. This disadvantage can be somewhat alleviated by providing two short rollers horizontally spaced near the full width of the frame. At least one rear ground contacting rolling support means is mounted to the rear end of frame 11 shown as rear roller 16 in FIGS. 1 and 3, and rear caster 16A in FIG. 2. All types of described forward ground contacting rolling support means may be used as rear ground contacting rolling support means and may be vertically adjustable with respect to frame 11 by rear bracket 15. A full width rear roller is preferred for mowers. Thus, the implement of this invention is supported on the ground by forward ground contacting rolling support means mounted to the forward end of the frame and rear ground contacting rolling support means mounted to the rear end of the frame providing complete support for the implement at fixed heights and implement attitude to the ground surface.

The implement is provided with two horizontally spaced lower implement hitch brackets 17 rigidly mounted on frame 11 at the rear portion. The lower implement hitch brackets may be mounted to the lower vehicle hitch brackets in many ways. Preferably, the lower mounting allows vertical movement of the rear of the implement with respect to the front of the vehicle. In one preferred embodiment, implement hitch brackets 17 are pivotally mounted at their rear portion by pivot 19a to the forward portion of vertically floating link means 18 which are mounted by pivot 19b to the vehicle lower hitch links 43. This double link, vehicle link 43 and implement floating link 18, mounting provides limited vertical movement at the rear of the implement of about four inches. Rear upper implement hitch bracket 20, or implement "mast", is mounted at its upper end to rear upper implement vertically pivotal and longitudinally floating link means 22 shown in FIGS. 1, 2 and 3 as hydraulic piston 24 with hydraulic cylinder 23 and in FIG. 4 as spring rod 26 with spring 27 on one side of implement hitch bracket 20 and spring 28 on the other side of implement hitch bracket 20 and adjacent vehicle upper hitch bracket 41. In both of the embodiments of the longitudinally floating link means described, the opposing spring and a floating hydraulic cylinder and piston, are adjusted to be free to travel longitudinally with little or no load. The springs may be adjusted by using springs having different compression force requirements for different implements, but this may require changing springs when different implements are attached. It is preferred to use a hydraulic cylinder as the longitudinally floating link means. While pushing an implement it is desired that the hydraulic cylinder and piston operate in a floating mode under low hydraulic pressure resistance. By the term "low" hydraulic pressure, I mean to include no hydraulic pressure resistance. Use of the hydraulic cylinder is also preferable since it can be activated and used to increase the aspect angle of the implement while in operation and when raising it from the ground, such as for travel or transporting, especially on a rough, uneven terrain.

Functioning of the implement according to this invention is best shown in FIG. 3. The implement is shown traversing relatively level ground 50(I) in solid lines and traversing relatively uneven ground level 50(II) in dashed lines. It is seen that when the forward and rear ground support rolling means of the implement are on relatively flat ground 50(I), hydraulic piston 24(I) is in about its central or mid-point position with respect to hydraulic cylinder 23(I). As the rear of the implement rises, as shown by dashed line uneven ground level 50(II) the implement maintains about the same distance above the ground level by piston 24(II) extending further outwardly from hydraulic cylinder 23(II). Likewise, when the rear of the implement is on lower ground than the forward portion, even relationship of the implement to the ground level is maintained by piston 24 extending further toward the rear end of hydraulic cylinder 23. As also can be seen in FIG. 3, rear lower implement hitch floating link 18 should provide pivoting in a vertical direction, and is preferably a floating link providing pivoting on both the vehicle attachment end and the implement attachment end, being in the position as shown by 18(I) on relatively flat ground and in the position as shown by 18(II) when the rear of the implement is elevated.

The implement and connection to the three point hitch according to this invention may be produced from any materials known by one skilled in the art to be satisfactory for such use based upon the requirements as set forth above. One skilled in the art by reading the above description will be able to choose satisfactory materials, components, and control systems to achieve the desired features of this invention.

The implement and three point hitch connection according to this invention allows excellent control for pushing the implement over uneven terrain while providing even implement operation at a predetermined height above the terrain regardless of its contour. The apparatus of this invention has been found especially suitable for pushing mowers over uneven terrain.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An implement adapted for connection to a front of a pushing vehicle comprising: the pushing vehicle having a vehicle three point hitch with two horizontally spaced forwardly extending vehicle lower hitch brackets defining two lower hitch points and a vehicle upper hitch bracket defining an upper hitch point, the implement comprising: an implement frame; at least one forward ground contacting rolling support means mounted to a forward portion of said implement frame; at least one rear ground contacting rolling support means mounted to a rear portion of said implement frame; two horizontally spaced implement lower hitch brackets rigidly mounted on a rear portion of said implement frame; each said implement lower hitch bracket mounted to a forward portion of a corresponding said vehicle lower hitch bracket; an implement upper hitch bracket secured to said implement frame at a rear portion of the implement, an adjustable link means having one end attached to said implement upper hitch bracket and an opposite end pivotally attached to said venicle upper hitch bracket, and said adjustable link means allowing longitudinal floating displacement of said implement upper hitch bracket along an axis of said adjustable link means for maintaining said at least one rear ground contacting rolling support means in continuous contact with the terrain while the pushing vehicle is in operation; and an implement hoisting hydraulic cylinder having one cylinder end pivotally secured to one of said vehicle lower hitch brackets and an opposite cylinder end secured to said vehicle upper hitch bracket.

2. An implement according to claim 1 wherein said forward ground contacting rolling support means comprises at least one caster.

3. An implement according to claim 1 wherein said forward ground contacting rolling support means comprises two horizontally spaced casters.

4. An implement according to claim 1 wherein said rear ground contacting support means comprises at least one caster.

5. An implement according to claim 1 wherein said rear ground contacting support means comprises two horizontally spaced casters.

6. An implement according to claim 1 wherein said adjustable link means comprises a hydraulic cylinder/piston assembly operating on low hydraulic pressure.

7. An implement according to claim 1 wherein said forward ground contacting rolling support means comprises at least one caster and said rear ground contacting support means comprises at least one caster.

8. An implement according to claim 1 wherein said forward ground contacting rolling support means comprises two horizontally spaced casters and said rear ground contacting support means comprises two horizontally spaced casters.

9. An implement according to claim 8 wherein said adjustable link means comprises a hydraulic cylinder/piston operating on low hydraulic pressure.

10. An implement according to claim 1 wherein said lower vehicle hitch brackets and said lower implement hitch brackets are connected by floating link means allowing vertical movement therebetween.

11. An implement according to claim 1 wherein said forward ground contacting rolling support means comprises two horizontally spaced forward casters, said rear ground contacting support means comprises two horizontally spaced rear casters, and said adjustable link means comprises a hydraulic cylinder/piston assembly operating on low hydraulic pressure.

12. In an implement for attachment to the front of a pushing vehicle, the improvement comprising: said implement having at least one forward ground contacting rolling support means mounted to a forward portion of an implement frame and at least one rear ground contacting rolling support means mounted to a rear portion of said implement frame; two horizontally spaced implement lower hitch brackets rigidly mounted on a rear portion of said implement frame; each said implement lower hitch bracket mounted to a forward portion of a corresponding vehicle lower hitch bracket; an implement upper hitch bracket secured to said implement frame at a rear portion of the implement, an adjustable link means having one end attached to said implement upper hitch bracket and an opposite end pivotally attached to said vehicle upper hitch bracket, said adjustable link means allowing longitudinal floating displacement of said implement upper hitch bracket along an axis of said adjustable link means for maintaining said at least one rear ground contacting rolling support means in continuous contact with a terrain while the pushing vehicle is in operation; and an implement hoisting hydraulic cylinder having one cylinder end pivotally secured to one of said vehicle lower hitch brackets and an opposite cylinder end secured to said vehicle upper hitch bracket.

13. An implement according to claim 1 wherein said at least one rear ground contacting rolling support means comprises a roller.

14. An implement according to claim 1 wherein said adjustable link means comprises a spring rod pivotally mounted at a central portion to said implement upper hitch bracket and having a spring mounted on each end portion and adapted to apply force to each side of said implement upper hitch bracket.

15. An implement according to claim 1 wherein said at least one forward ground contacting rolling support means comprises at least one caster mounted to said implement frame and said rear ground contacting support means comprises a roller mounted to said implement frame.

16. An implement according to claim 1 wherein said at least one forward ground contacting rolling support means comprises two horizontally spaced casters mounted to said implement frame and said rear ground contacting support means comprises a roller mounted to said implement frame.

17. An implement according to claim 16, wherein said adjustable link means comprises a hydraulic cylinder/piston assembly operating on low hydraulic pressure.

18. An implement according to claim 16 wherein said adjustable link means comprises a spring rod pivotally mounted at a central portion to said implement upper hitch bracket and having a spring mounted on each end portion and adapted to apply force to each side of said implement upper hitch bracket.

* * * * *